United States Patent [19]
Shannon

[11] Patent Number: 5,207,255
[45] Date of Patent: May 4, 1993

[54] AWNING SUPPORT BRACE

[76] Inventor: John R. Shannon, 12 Gres Ct., Bradford, Canada, L3Z 2S4

[21] Appl. No.: 833,451

[22] Filed: Feb. 6, 1992

[51] Int. Cl.⁵ .................................................. E04F 10/00
[52] U.S. Cl. ........................................ 160/65; 160/46
[58] Field of Search .................. 160/65, 66, 67, 46, 160/22; 135/89

[56] References Cited
U.S. PATENT DOCUMENTS

| | | | |
|---|---|---|---|
| 2,808,065 | 10/1957 | Ellis | 160/46 |
| 4,192,112 | 3/1980 | Reilly | 160/65 X |
| 4,640,332 | 2/1987 | Turner | 160/65 X |
| 4,658,877 | 4/1987 | Quinn | 160/46 |
| 4,801,119 | 1/1989 | Pelletier | 135/89 X |
| 4,854,363 | 8/1989 | Fouquet | 160/66 X |
| 4,862,940 | 9/1989 | Atchison | 160/67 |

Primary Examiner—David M. Purol

[57] ABSTRACT

Disclosed herein is an awning support brace for a retractable awning of the type having a remote edge supported by a plurality of retractable arms extending outwardly from a base; the stabilizer including a frame member having a pair of ends with a first pivot arrangement on one end and a second pivot arrangement on the other end, the first pivot arrangement being attachable to the remote edge and the second pivot arrangement being attachable to a secure location beneath the remote edge, the brace being arranged to minimize deflections caused by wind that would otherwise damage the base while permitting the arms to deflect in a manner to absorb forces caused by the wind.

5 Claims, 4 Drawing Sheets 5,207,255

AWNING SUPPORT BRACE

BACKGROUND OF THE INVENTION

1. Field of the Invention

The present invention relates to awnings and more particularly retractable 'patio-type' awnings.

2. Description of the Related Art

It is common in retractable 'patio-type' awnings to be secured from a wall, wall soffit, roof truss (or similar structure and project outwardly from a storage position to a fully deployed position, the latter of which can be as much as 12 feet away supported only horizontally by 2, 3 or 4 projecting arms. These arms are normally spring biased toward the fully deployed position and are movable between the storage and fully deployed positions by way of a manual crank or electric motor.

These awnings are susceptible to winds. The slightest gust can in some cases cause the awning to rise slightly and rebound downwards. Although these awnings are designed to rise and fall in mild winds, this motion is annoying and concerns the end user. Both the projecting arms and support structure are susceptible to physical damage unless this vertical movement is stabilized. Existing awnings, as described above, are especially susceptible to the effects of wind gusts or 'wind-sheer' (which occurs when the wind moves rapidly with downward force.

The most common remedy has been for the end user to 'tie-down' the awning, using string or elastic 'bungie' cords. This technique, however, is not effective in cases of wind sheer, or the downward motion of the awning, since the string or elastic cords are incapable of providing upward support.

Wind-caused vertical motion usually causes the wall support brackets to loosen, damage to brickwork or woodwork, or, most common, major damage to the awning's horizontal projecting arms. To avoid this vertical motion, the end user is compelled to retract the awning in the mildest of winds, thereby losing the sun's protection for which the awning was originally designed to provide.

It is therefore an object of the present invention to obviate or mitigate the above mentioned disadvantages.

SUMMARY OF THE INVENTION

Briefly stated, the invention involves an awning support brace for a retractable awning of the type having a remote edge supported by a plurality of retractable arms extending outwardly from a base; the stabilizer comprising a frame member having a pair of ends with a first pivot means on one end and a second pivot means on the other end, the first pivot means being attachable to the remote edge and the second pivot means being attachable to a secure location beneath the remote edge, the brace being arranged to minimize deflections caused by wind that would otherwise damage the base while permitting the arms to deflect in a manner to absorb forces caused by the wind.

In another aspect of the present invention, there is provided a method of securing a retractable awning against vertical wind loads, the awning being of the type having a remote edge spaced from a base and supported by a plurality of retractable arms, the method comprising the steps of:

i) providing a plurality of awning support braces, each with a pair of pivot elements on either end;

ii) attaching one of the pivot elements to a location near the remote edge of the awning;

iii) attaching the other of the pivot elements to a secure location below the remote edge, such that the awning support brace minimizes deflections caused by wind that would otherwise damage the base while permitting the arms to deflect in a manner to absorb forces caused by the wind.

BRIEF DESCRIPTION OF THE DRAWINGS

Several preferred embodiments of the present invention will now be described, by way of example only, with reference to the appended drawings in which.

DESCRIPTION OF THE PREFERRED EMBODIMENTS

Figure 1:
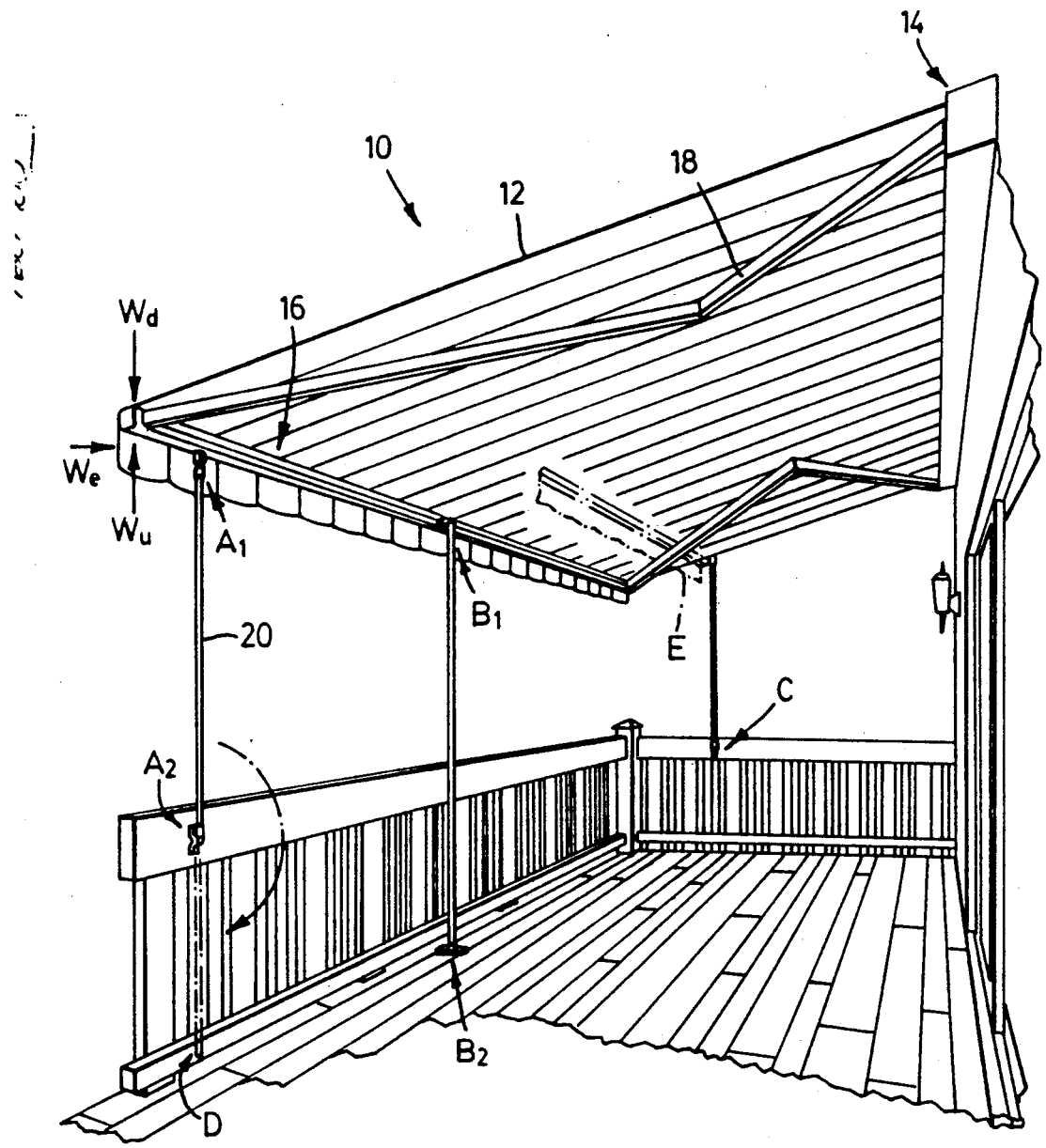
FIG. 1 is a perspective sketch of an awning assembly.

Referring to FIG. 1, there is provided an awning assembly 10 mounted to a building above a patio area. The awning assembly 10 has a fabric top 12 mounted between a base 14 and a channel member 16 located along the remote edge of the awning. The base and channel members 14, 16 are joined at each end by a pair of spring loaded retractable arms 18.

A particular feature of the awning assembly 10 is the awning support brace 20 joined between the channel member 16 and a secure location beneath the channel member 16 (in this case a patio railing shown at 'A2' and 'C' or the surface of the patio deck as shown at 'B2') by a pair of coupling members.

It will be seen that one awning support brace 20 is provided for each retractable arm 18 and a minimum of two awning support braces 20 are provided for the typical awning. It is recommended that an awning support brace 20 be installed adjacent each existing retractable arm 18 to provide a satisfactory support.

Figure 2:
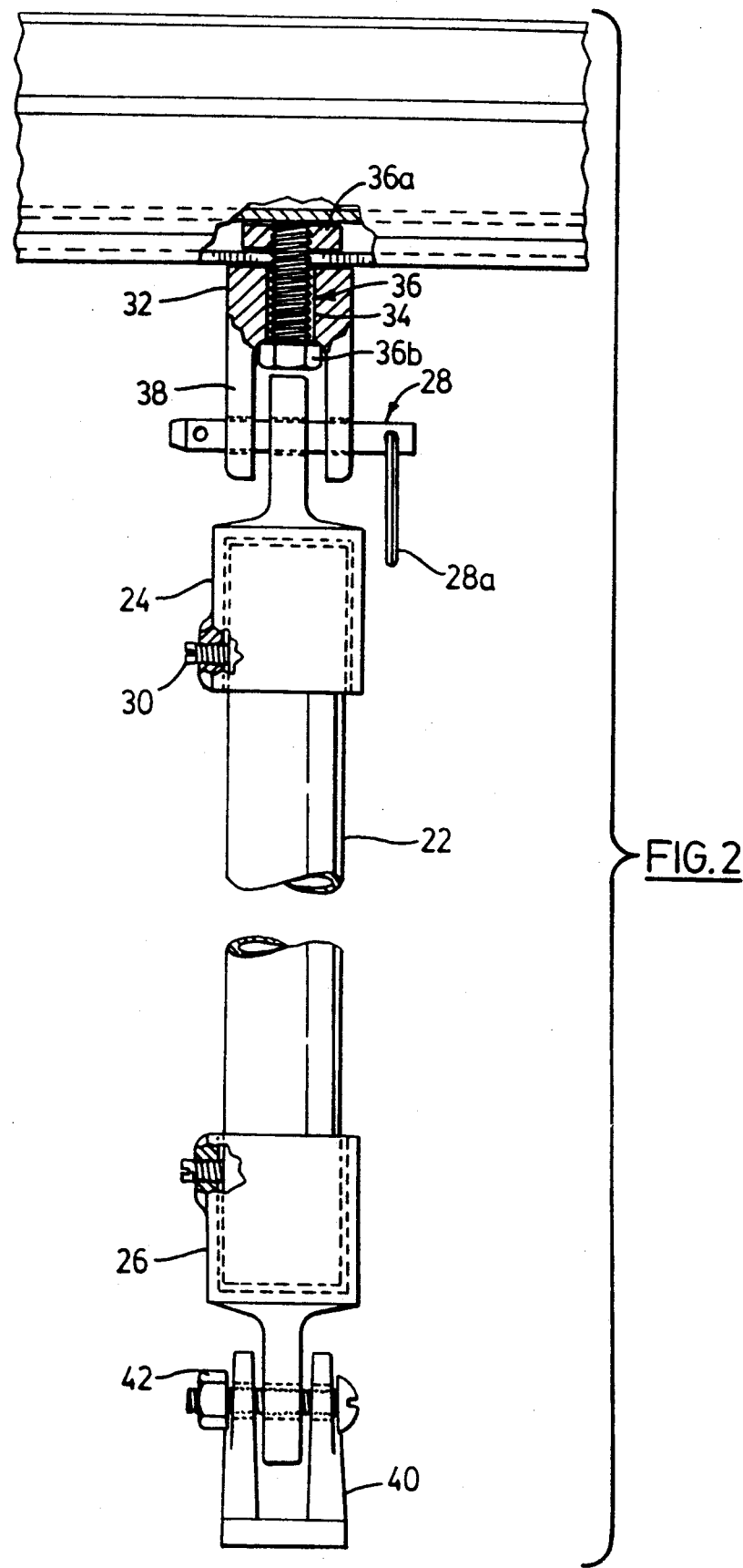
FIG. 2 is a side view of an awning support brace, one component of the assembly illustrated in FIG. 1.

Referring to FIG. 2, the awning support brace 20 has a substantially rigid frame member in the form of a pole 22 having a pair of ends held in a respective pair of sleeve clamps 24, 26. Each clamp has a hole for the passage of a removable pin 28, which is in turn provided with a finger ring 28a to assist in insertion and removal. The pole 22 is held in each clamp 24, 26 by a set screw 30 which enables the clamp at either end to rotate 360 degrees. This is desirable as it allows the awning support brace 20 to be installed at the most appropriate secure location immediately beneath the channel member 16 with whatever angle of incline the secure location might have.

With the pin 28, the upper sleeve clamp 24 is joined to a coupling member in the form of a hinge clamp 32, itself attached to the channel member 16. The hinge clamp 32 has a bore 34 to receive the shank of a bolt and a pair of webs 38 to be positioned on either side of the upper sleeve clamp. The hinge clamp 32 is attached to the channel 16a by way of a nut and bolt 36 arrangement wherein the nut 36a is secured within the channel and the bolt is passed through a bore in the hinge clamp 32 so that the head of the bolt is positioned between the webs 38.

Figure 3:
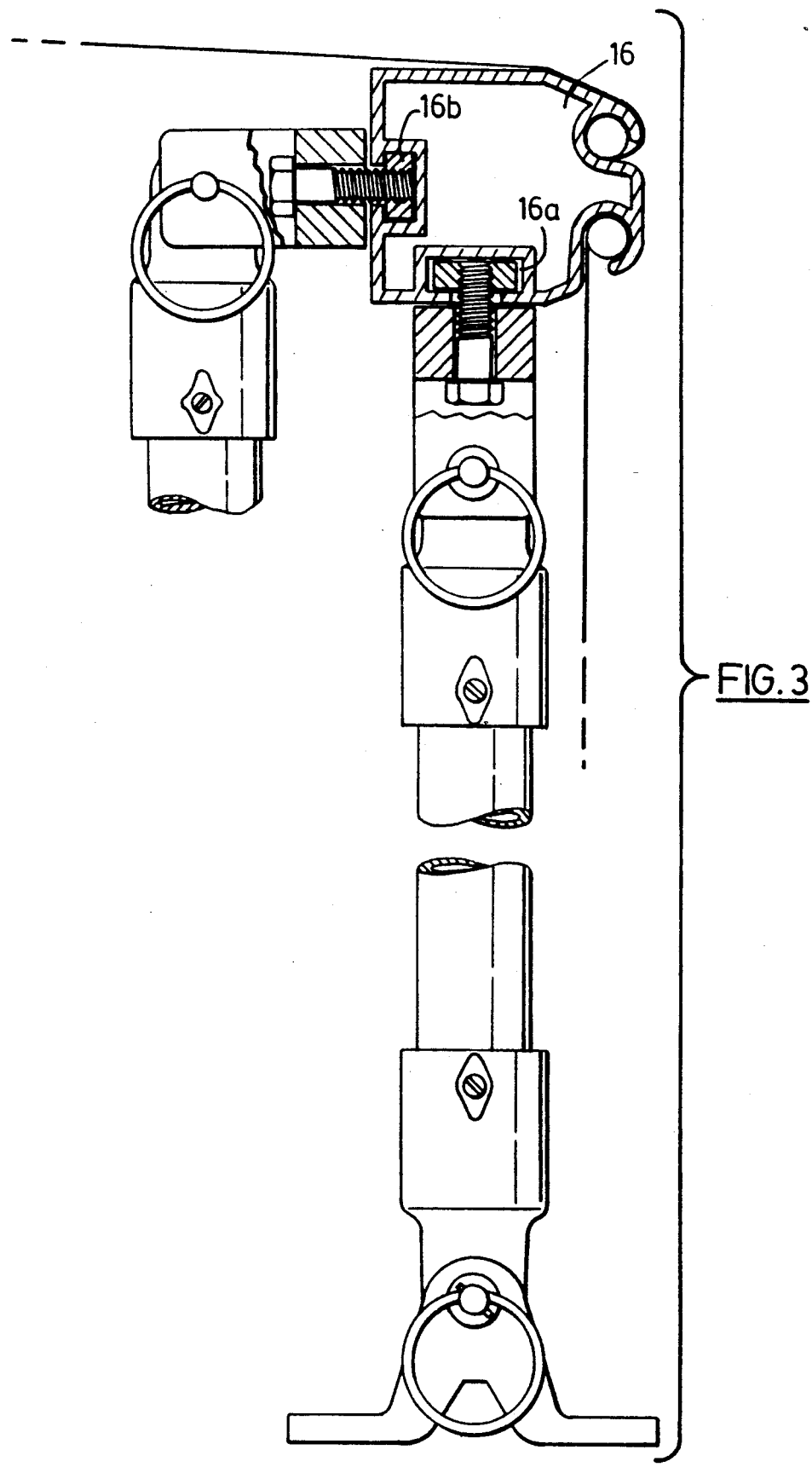
FIG. 3 is another side view of the awning support brace.

As can be seen in FIG. 3, the channel may be provided in the bottom surface, as for example at 16a, or in a side surface, as for example at 16b.

As with the upper sleeve clamp, the lower sleeve clamp 26 is secured to another coupling member in the form of a hinge clamp 40, itself fastened to the railing or deck of the patio as shown in FIG. 2.

To install the awning support brace 20, the end user deploys the awning assembly 10 to the desired position, be that a fully deployed position as shown in solid lines in FIG. 1 or a partially deployed position as shown in dashed lines at position E. The lower sleeve clamp 26 is attached to the lower hinge clamp 40 by way of the nut and bolt as shown at 42.

The upper sleeve clamp 24 is then attached to the upper hinge clamp 32 by aligning the holes in the webs 38 with the hole and inserting the removable pin 28. This process is repeated for each awning support brace to be installed on the awning. It is recommended that a least one awning support brace be installed for each retractable arm in the awning assembly, for example: 3 arms- use three awning support braces, 4 arms- use 4 awning support braces, and so forth.

With the awning support braces 20 in place, wind loads, as identified by the wide arrow 'We' may still be deflected by the spring loaded retractable arms 18. However, vertical deflections, identified by the wide arrows 'Wu' and 'Wd' are minimized and in fact may be inhibited entirely depending on the tightness of the connections between the upper and lower sleeve and hinge clamps, the length of the brace and the like. Furthermore, should the wind cause vibrations in the assembly, such vibrations will not cause the upper hinge clamp 32 to separate from the channel member 16 since the nut and bolt arrangement are effectively captured in place by the installed sleeve clamp. Should the bolt loosen, it will eventually abut the free end of the sleeve clamp 24 and further loosening is inhibited. Of course, the dimensions of the hinge clamp 32 and the bolt may be selected so that the head of the bolt is in contact with the free end of the sleeve clamp.

In effect, the proximity of the sleeve clamp to the head of the bolt and the channel to the nut serves as a first and second limit to the path of travel of the bolt and nut should they loosen as a result of fluctuating wind loads.

Should the end user wish to retract the awning, one needs only to remove the pin 28 with the finger ring which separates the awning support brace 20 from the channel and the awning assembly 10 is now free to be retracted.

The awning support brace 20 may be sold separately as a kit, provided the nut is capable of fitting the range of channel members 16 currently on the market. The kit may include a number of nuts, each of which is sized to fit a different type of channel. The brace may be of any suitable material, including steel, aluminum, plastic and fibre glass, provided that it is sufficiently rigid to withstand the maximum loads to be exerted on the brace when in use. For example, one might wish to use ⅞ diameter aluminum tube piping.

Several kits may also be provided, namely with different sized braces, thereby to accommodate the varying distances between the channel member 16 and the closest secure location beneath it. This may be important if the end user wishes to secure the awning assembly 10 in a partially deployed position and shown at 'E'.

The kit may also be provided with instructions on custom fitting the awning support brace 20 for any particular installation. For example, the user may be instructed to do the following:

i) Install the upper and lower hinge clamps on the channel member and a secure location beneath the channel member;

ii) Once the upper and lower clamps are installed, measure the distance from the 'eye' of the upper hinge clamp 32 to the 'eye' of the lower hinge clamp;

iii) Deduct ¾ inch from the distance in i) to obtain a correct length of the pole 22 and cut the pole 22 to this length; and iv) Fully insert the pole 22 into the upper and lower hinge clamps 24, 26, align both clamps 24, 26 and tighten.

In the above example, the awning support brace 20 is dimensioned to be longer than the distance between the channel member 16 and the secure location beneath it to lift the awning assembly 10 slightly from its lowermost position, thereby to minimize rattles.

The brace may also be length adjustable, thereby permitting the end user to adjust the length of the brace to match the distance between the channel and the closest secure location beneath it. Of course, the clamp maintaining the length of the brace need sufficient integrity to withstand the compressive and tensile forces that should be expected in maximum wind loading conditions.

Figure 4:
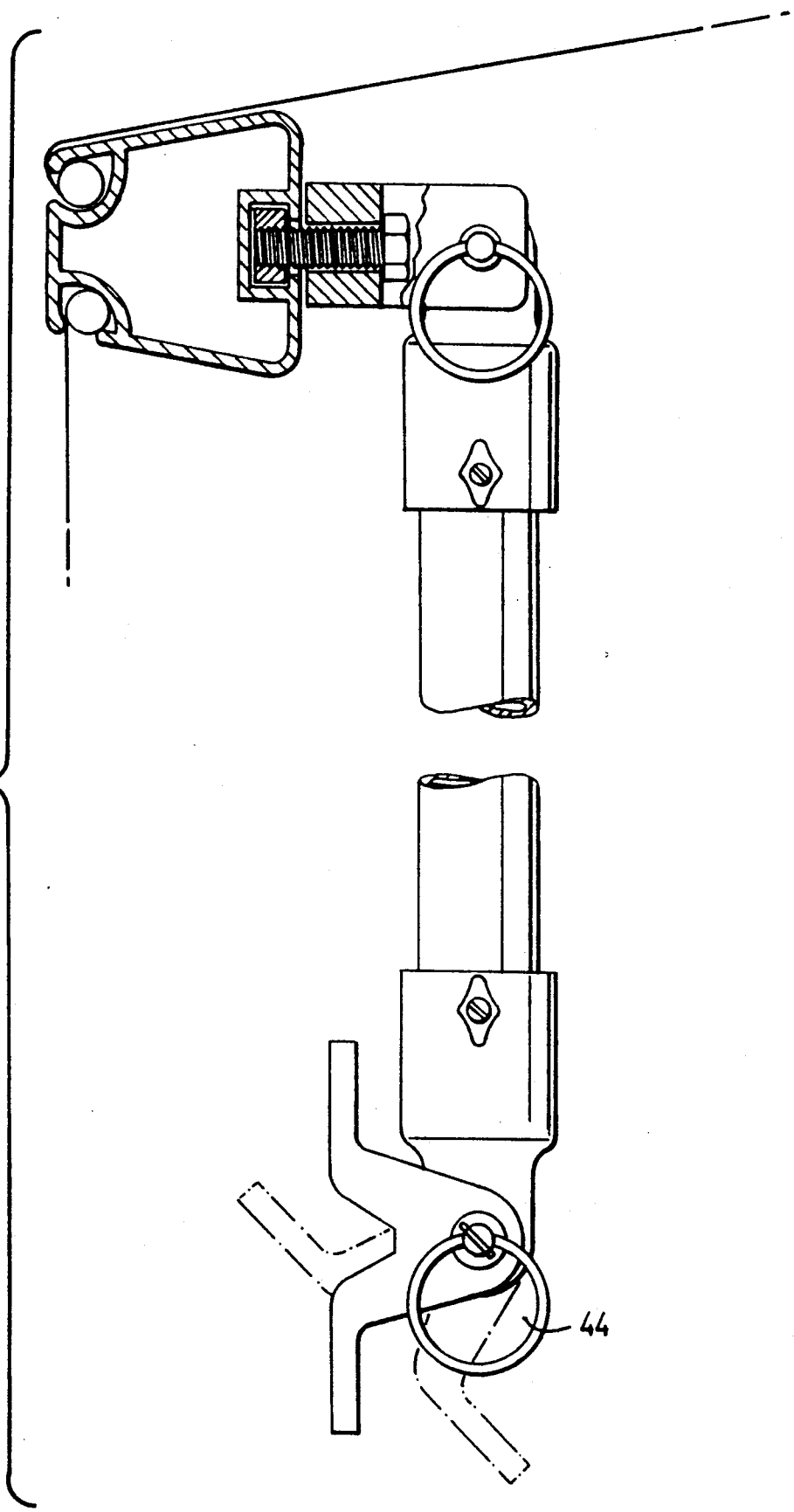
FIG. 4 is another side view of an awning support brace in an alternative configuration.

The nut and bolt securing the lower hinge clamp 32 to the secure location may be replaced by a removable pin 28 as shown at 44 in FIG. 4, thereby permitting the end user easily to remove for storage. Alternatively, the end user may simply allow the brace to swing downwardly, as would be the case in position, 'D', for storage.

One should bear in mind that the awning support braces 20 supporting a particular awning may be the same length, but may also be of varying lengths, depending whether the distance between the channel member 16 and the nearest secure location remains constant. If this distance changes, for example by a change in height of a railing, different sized awning support braces 20 must be used accordingly. In the case of the length adjustable awning support brace 20, the length is adjusted to accommodate the distance between the channel member 16 and the secure location at the particular installation site.

The awning support brace 20 has the following benefits:

i) The awning support brace 20 provides a temporary manually operated device for reducing the vertical motion of projected retractable awnings, while permitting the end user to quickly remove the support and retract the awning assembly as and when desired.

ii) The awning support brace 20 may be sold as a kit with a series of different sized machined slot nuts which enable the awning support brace 20 to be attached to a variety of existing awnings.

iii) With the awning support brace 20 installed as shown in the figures, the awning assembly may be capable of dissipating up to approximately 15 mph through the horizontal motion of the existing awning arms 18 and fabric with little or no vertical motion;

iv) The awning support brace 20 provides stability for the awning assembly when it is left in a deployed position to protect against sudden wind disturbances.

v) The awning support brace 20 permits the user to quickly hook up or release the brace as the case may be thanks to the use of the removable pins 44.

I claim:

1. A retractable awning installation comprising a remote edge member supported by a plurality of retractable arms extending outwardly from a base; a support brace including a frame member having a pair of ends with a first pivot means on one end and a second pivot means on the other end, said first pivot means being attachable to said remote edge member and said second pivot means being attachable to a secure location beneath said remote edge member, said brace being arranged to minimize deflections caused by wind that would otherwise damage said base while permitting said arms to deflect in a manner to absorb wind forces, said first pivot means being attached to said remote edge member by way of a coupling arrangement, said coupling arrangement including a fastener with two threaded elements, which have the tendency to loosen and thereby be displaced along a path by the action of wind forces, said path having a first limit and a second limit, said first limit being formed by said remote edge member and said second limit being formed by said support brace.

2. An installation as defined in claim 1 wherein said remote edge member includes a channel member with a surface having a channel formed therein, said coupling element being coupled to said channel member and one element of said fastener being entrained in said channel, wherein said channel member serves to inhibit a first one of said paths.

3. An installation as defined in claim 2 wherein said wherein one end of said frame member is held in said coupling element in such a manner to be positioned adjacent one of said fastener elements thereby to serve as said second limit.

4. A retractable awning installation comprising a remote edge member supported by a plurality of retractable arms extending outwardly from a base; a support brace including a frame member having a pair of ends with a first pivot means on one end and a second pivot means on the other end, said first pivot means being attachable to said remote edge member and said second pivot means being attachable to a secure location beneath said remote edge member, said brace being arranged to minimize deflections caused by wind that would otherwise damage said base while permitting said arms to deflect in a manner to absorb forces caused by the wind, said remote edge member including a surface having a channel formed therein, said first pivot means including a coupling element coupled to said channel member by a fastener entrained in said channel, wherein one end of said frame member is held in said coupling element, said fastener includes a bolt and nut threaded there on, said nut being entrained in said channel and said bolt having a head located adjacent the end of said frame member, whereby said coupling member inhibits displacement of said frame member therefrom while the end of said frame member inhibits said bolt from disengaging from said nut.

5. A method of securing a retractable awning against vertical wind loads, said awning being of the type having a remote edge member spaced from a base and supported by a plurality of retractable arms, said method comprising the steps of:

providing a plurality of awning support braces, each with a pair of pivot elements on either end;

attaching one of said pivot elements to the remote edge member of said awning;

providing coupling arrangement including, a fastener with two threaded elements, providing said fastener with a path for the displacement of said elements as a result of wind forces loosening them;

arranging said remote edge member to serve as a first limit for said path;

arranging said support brace to serve as a second limit for said path attaching the other of said pivot elements to a secure location below said remote edge member, such that said awning support brace minimizes deflections caused by wind that would otherwise damage said base while permitting said arms to deflect in a manner to absorb said wind forces.

* * * * *